US011112617B2

(12) United States Patent
Harris et al.

(10) Patent No.: US 11,112,617 B2
(45) Date of Patent: Sep. 7, 2021

(54) LUMINAIRE

(71) Applicant: Robert Bosch Start-Up Platform North America, LLC, Series 1, Redwood City, CA (US)

(72) Inventors: Todd Louis Harris, Fremont, CA (US); William Weber, Olivebridge, NY (US); Audrey Steever, Fremont, CA (US)

(73) Assignee: ROBERT BOSCH START-UP PLATFORM NORTH AMERICA, LLC, SERIES 1, Redwood City, CA (US)

( * ) Notice: Subject to any disclaimer, the term of this patent is extended or adjusted under 35 U.S.C. 154(b) by 223 days.

(21) Appl. No.: 16/193,138

(22) Filed: Nov. 16, 2018

(65) Prior Publication Data

US 2019/0155039 A1  May 23, 2019

Related U.S. Application Data

(60) Provisional application No. 62/625,221, filed on Feb. 1, 2018, provisional application No. 62/625,205, filed (Continued)

(51) Int. Cl.
*G02B 27/09* (2006.01)
*G02B 5/10* (2006.01)
(Continued)

(52) U.S. Cl.
CPC ............ *G02B 27/0983* (2013.01); *F21V 7/00* (2013.01); *G02B 5/10* (2013.01); *G02B 19/0023* (2013.01)

(58) Field of Classification Search
CPC .. G02B 5/10; G02B 19/0023; G02B 27/0983; F21V 7/00
(Continued)

(56) References Cited

U.S. PATENT DOCUMENTS 5,631,778 A   5/1997 Powell
5,725,296 A   3/1998 Bibbiani et al.
(Continued)

FOREIGN PATENT DOCUMENTS

WO   2017013816 A1   8/2018

OTHER PUBLICATIONS

International Search Report and Written Opinion for PCT Application No. PCT/US2018/061546, dated Mar. 29, 2019, 10 pages.

*Primary Examiner* — Ricky D Shafer
(74) *Attorney, Agent, or Firm* — Brooks Kushman P. C.

(57) ABSTRACT

A spreading optics system distributes electromagnetic (EM) waves emitted by an emitter having an emission vector. The spreading optics system includes reflective surfaces. The reflective surfaces include concave first reflector having a concave cross section in a plane substantially perpendicular the emission vector. The reflective surfaces further include a convex second reflector arranged further from the emitter than the concave first reflector. The convex second reflector has a convex cross section in a second plane substantially parallel the first plane. The reflective surfaces are configured to divergently redirect the EM waves into a vector fan at a predetermined angle relative to the emission vector.

18 Claims, 3 Drawing Sheets

Related U.S. Application Data on Feb. 1, 2018, provisional application No. 62/588,518, filed on Nov. 20, 2017, provisional application No. 62/588,227, filed on Nov. 17, 2017.

(51) Int. Cl.
*F21V 7/00* (2006.01)
*G02B 19/00* (2006.01)

(58) Field of Classification Search
USPC .......................................................... 359/859
See application file for complete search history.

(56) References Cited

U.S. PATENT DOCUMENTS

| | | | |
|---|---|---|---|
| 5,844,638 A | 12/1998 | Ooi et al. | |
| 7,771,067 B2* | 8/2010 | Yafuso | G02B 5/10 359/851 |
| 9,379,457 B2* | 6/2016 | Shiue | H01Q 25/04 |
| 9,544,488 B2 | 1/2017 | Dawson et al. | |
| 9,933,604 B1* | 4/2018 | Lu | G02B 13/02 |
| 2011/0305014 A1 | 12/2011 | Peck | |
| 2015/0373312 A1 | 12/2015 | Miura | |
| 2018/0203338 A1 | 7/2018 | Kawamura et al. | |
| 2019/0154885 A1* | 5/2019 | Steever | G02B 3/04 |
| 2019/0155007 A1* | 5/2019 | Steever | G02B 17/086 |
| 2019/0155040 A1* | 5/2019 | Steever | G02B 27/126 |

\* cited by examiner

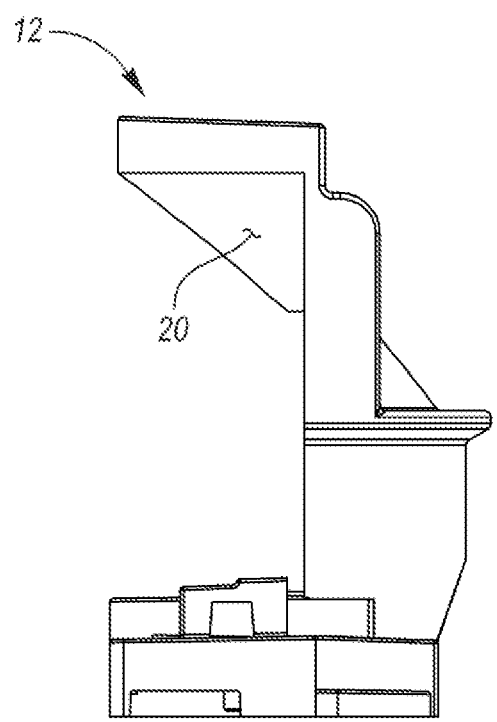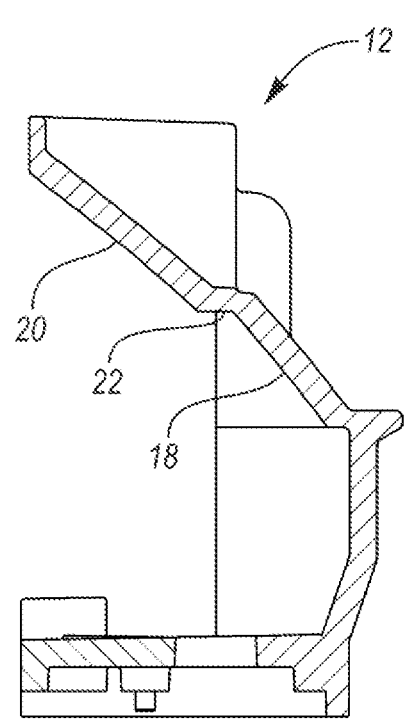
FIG. 3  FIG. 4
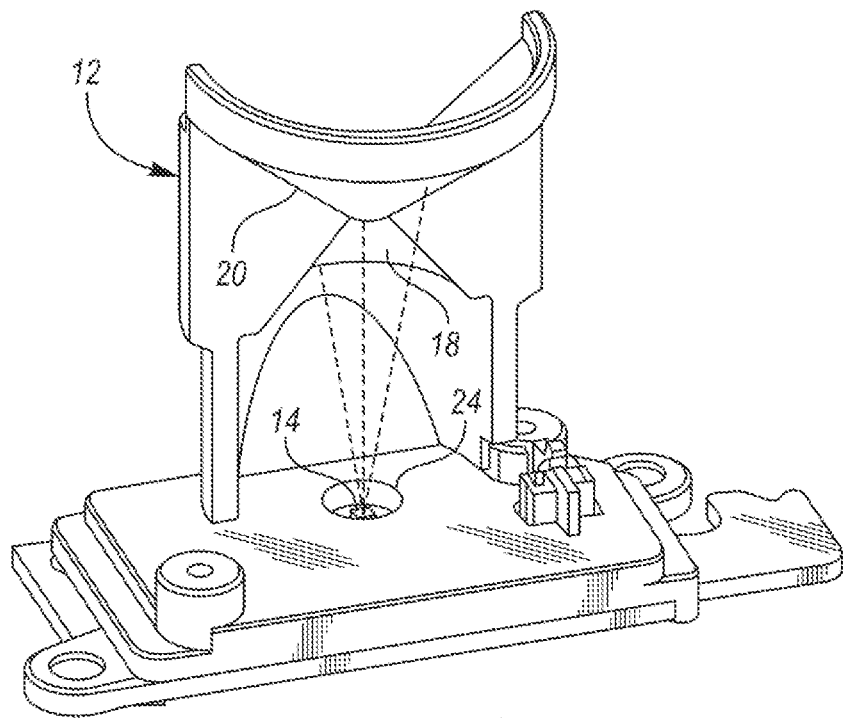
FIG. 5

LUMINAIRE

CROSS-REFERENCE TO RELATED APPLICATIONS

This application claims the benefit of U.S. provisional application No. 62/625,221 filed Feb. 1, 2018; U.S. provisional application No. 62/625,205 filed Feb. 1, 2018; U.S. provisional application No. 62/588,518 filed Nov. 20, 2017; and U.S. provisional application No. 62/588,227 filed Nov. 17, 2017, the disclosures of which are hereby incorporated in their entirety by reference herein.

TECHNICAL FIELD

This invention relates generally to the optics field, and more specifically to a new and useful apparatus for shaping and spreading a beam of light.

BACKGROUND

Optical systems can be used in range finding applications, navigation applications, radial metrology applications, laser-based applications, illumination, or other suitable operations.

SUMMARY

In one embodiment, a spreading optics system for distributing electromagnetic (EM) waves emitted by an emitter having an emission vector (e.g., a principal emission vector) is disclosed. The spreading optics system includes reflective surfaces. The reflective surfaces include a concave first reflector having a concave cross section in a first plane substantially perpendicular to the emission vector and a convex second reflector arranged further from the emitter than the concave first reflector. The convex second reflector includes a convex cross section in a second plane substantially parallel to the first plane. The reflective surfaces are configured to redirect the EM waves in a fanned distribution (e.g. divergent) having a vector fan at a predetermined angle relative to the emission vector. The predetermined angle may be 90° thereby the vector fan would be planar.

The concave cross section and the convex cross section can be from circular cones, which may be right circular cones. The concave first reflector and the convex second reflector may be laterally and axially offset from each other relative to the emission vector. The conical axes of the concave first reflector and the convex second reflector may be arranged in parallel.

In another embodiment, a spreading optics system for distributing electromagnetic (EM) waves emitted by an emitter having an emission vector (e.g., a principal emission vector) is disclosed. The spreading optics system includes reflective surfaces including a concave hemiconic first reflector and a convex hemiconic second reflector arranged further from the emitter than the concave hemiconic first reflector. The reflective surfaces are configured to redirect the EM waves in a fanned distribution (e.g. divergent) having a vector fan at a predetermined angle (e.g., 90°) relative to the emission vector, thereby the vector fan would be planar. In this embodiment, the concave hemiconic first reflector includes a first slice from a circular first hemicone and the concave hemiconic second reflector includes a second slice from a circular second hemicone. The circular first and second cones may be right circular cones. The concave first and the convex second hemiconic reflectors may be laterally and axially offset from each other relative to the emission vector. The conical axes of the concave first and convex second hemiconic reflectors may be arranged in parallel.

In a third embodiment, a spreading optics system for distributing electromagnetic (EM) waves emitted by an emitter having an emission vector (e.g., a principal emission vector) is disclosed. The spreading optics system includes a reflective surface including a concave hemiconic first reflector and a convex hemiconic second reflector arranged further from the emitter than the concave hemiconic first reflector. The reflective surfaces may be configured to redirect the EM waves in a fanned distribution (e.g. divergent) having a vector fan at a predetermined angle relative to the emission vector. The spreading optics system includes an emitter aperture configured to permit EM waves to egress from the emitter to first and second reflectors. The emitter aperture may be integral with the reflector assembly body or may be a separate piece. Further, the reflective surfaces may further include a third reflector or absorbing surface joining the concave first and the convex second hemiconic reflector. An extent of the third reflective surface or absorber extending from the concave first hemiconic reflector to the convex second hemiconic reflector may be less than 10% of a base radius of the first and/or second reflector. The concave hemiconic first reflector may include a first slice from a circular cone and the concave hemiconic second reflector may include a second slice from a circular cone. The third reflector may be arranged perpendicular to the axis of the circular cone. The emitter aperture may be circular.

BRIEF DESCRIPTION OF THE DRAWINGS

FIG. 3 is a side view of the example of the spreading optic.

FIG. 4 is a side cutaway view of the example of the spreading optic.

FIGS. 5 and 6 are an isometric and a cutaway view respectively of a spreading optic example's alignment with an emitter.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

Figure 1:
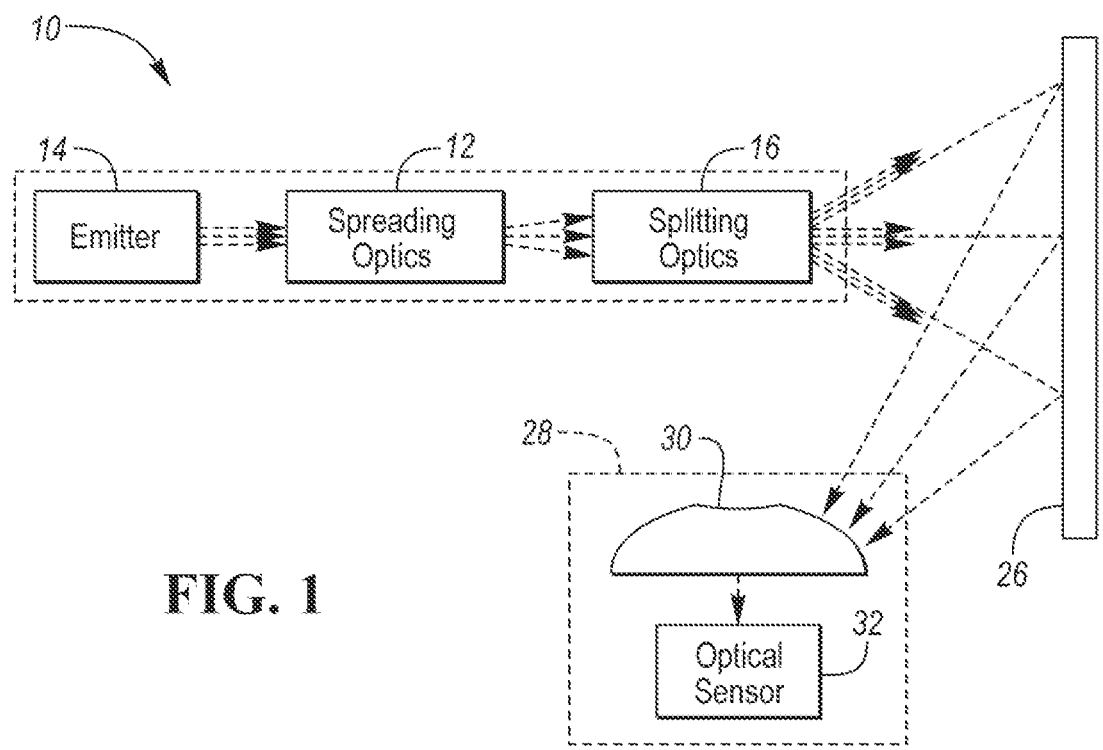
FIG. 1 is a schematic representation of an example optical system using a spreading optic and an emitter.

As shown in FIG. 1, spreading optic 12 of illumination system 10 functions to spread electromagnetic waves emitted by emitter 14. Spreading optic 12 (otherwise referred as a luminaire) may evenly distribute the electromagnetic waves (EM waves) along a predetermined axis or region, but may alternatively or additionally unevenly distribute the EM waves, distribute the EM waves in a pattern (e.g., predetermined, dynamically determined, etc.), or distribute the EM waves in any suitable manner. The rays of the distributed EM waves may be parallel to each other (e.g. collimated or pseudo-collimated) but may alternatively be divergent or convergent. Spreading optic can optionally function to redirect the EM waves at a predetermined angle to an emission vector (e.g., a principal emission vector) (e.g., 20°, 30°, 45°, 60°, 90°, 135°, etc. to the emission vector).

Spreading optic 12 may distribute the EM waves along a first axis and a plane perpendicular the first axis (e.g., encompassing a second and third axis), but can alternatively distribute the EM waves along the first axis only, the second or third axis only, the plane only, or along any suitable set of: axes, plane(s), or redirection vector(s). The first axis may be parallel the emission vector of emitter 14 but may alternatively be perpendicular the emission vector or arranged at any suitable angle to the emission vector. The plane may be parallel the emission vector of emitter 14 but may alternatively be at any suitable angle to the emission vector. In one example, spreading optic 12 spreads the emitter's vertical light beam (e.g., emitted along the z-axis) both vertically (e.g., along the z-axis) and horizontally (e.g., along the x/y-plane), to form a horizontal light band thicker than a vertical (e.g. z-axis) light beam. The resultant light band may be substantially uniform (e.g., the band's optical parameters, such as amplitude, wavelength, frequency, irradiance, or other parameters, are substantially the same at all points at a predetermined distance from the spreading optic), but can alternatively be non-uniform, irregular, structured, or otherwise configured. However, spreading optic 12 can generate any suitable EM wave distribution. In one or more embodiments, a focusing or diverging optic can be situated between emitter 14 and the reflective surfaces 18, 20 of spreading optic 12. The focusing optic can be configured to pre-collimate the light beam or EM waves emitted by emitter 14 before it reaches the reflective surfaces 18, 20 of spreading optic 12. A diverging optic (e.g. negative lens) between emitter 14 and spreading optic 12 can be used to diverge the light beam or EM waves emitted by emitter 14 before it reaches the reflective surfaces 18, 20 of spreading optic 12. In further embodiments, a mirror (e.g. fold mirror) between emitter 14 and the spreading optic 12 can be used to redirect the light beam or EM waves emitted by emitter 14 before it reaches the reflective surfaces 18, 20 of spreading optic 12, thereby allowing convenient orientation or placement of the emitter 14. Such fold mirror may be planar or may be concave or convex to decrease or increase respectively the emission beam divergence, and may further be used to adjust the alignment between the emitter 14 and spreading optic 12 either manually (e.g. at manufacturing alignment, or for servicing) or dynamically.

Spreading optic 12 may be made from a single unitary piece (e.g., using injection molding, CNC machining, 3D printing, etc.), but can alternatively be constructed from multiple pieces. Spreading optic 12 and/or arrangement may be static but may alternatively be actuatable. In the latter example, the axial or lateral position of spreading optic 12 relative to emitter 14 (and/or secondary optics, such as splitter film or splitting optics 16) may be dynamically adjusted (e.g., by a motor, linear adjustment system, etc.). Additionally, or alternatively, the curvature of the reflective surfaces 18, 20 of spreading optic 12 may be dynamically adjusted, such as by using shape-memory material (e.g., Nitinol), a mechanical actuator, or any other suitable adjustment mechanism. The body of spreading optic 12 may be opaque but can alternatively be translucent or transparent. Spreading optic 12 body may be black or be any suitable color, or may be absorbing at any desired wavelength(s). The reflective surfaces 18, 20, 22 of spreading optic 12 may be at least 85% reflective at the wavelengths emitted by emitter 14 (e.g., 850 nm), but may alternatively have a higher or lower reflectance at any suitable wavelength. The properties (e.g. reflectance, absorbance, etc.) of the reflective surfaces 18, 20, 22 of spreading optic 12 may vary spatially or temporally (e.g. modulated). The reflectance of the reflecting surfaces 18, 20, 22 may be conferred as a function of the material selection, by using optical coating(s) (e.g., protected aluminum), mechanically (e.g. orienting surfaces such that incident light strikes at angles equal to or greater than the critical angle of incidence for refraction per Snell's Law), or otherwise obtained. The surface roughness of the reflective surfaces can preferably be less than 75 angstroms RMS or have any suitable surface roughness. The reflective surfaces 18, 20, 22 of spreading optic 12 may be first-surface mirrors where the light reflects off the outer surface of the optic but can alternatively be second-surface mirrors where the input rays strike and reflect off an internal surface. The bodies of the second-surface mirrors may be made of a broadly transparent optical material but may alternatively be made of a material that is selectively transparent at the wavelengths emitted by emitter 14 and absorbent at other wavelengths.

Figure 2:
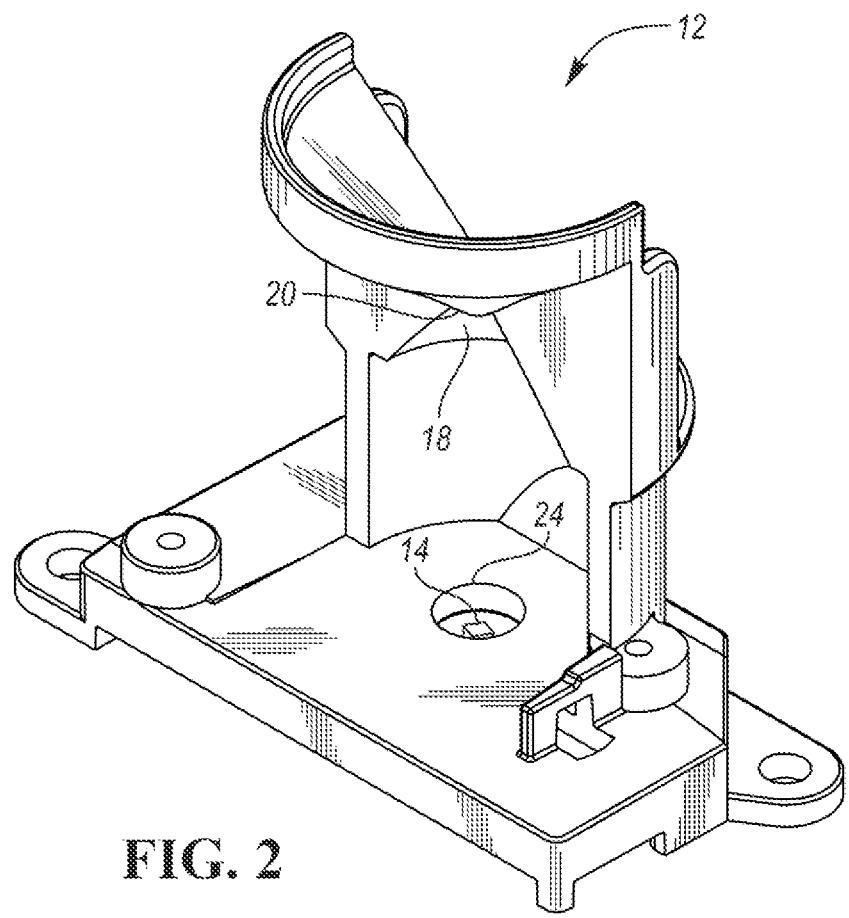
FIG. 2 is an example of the spreading optic.
Figure 6:
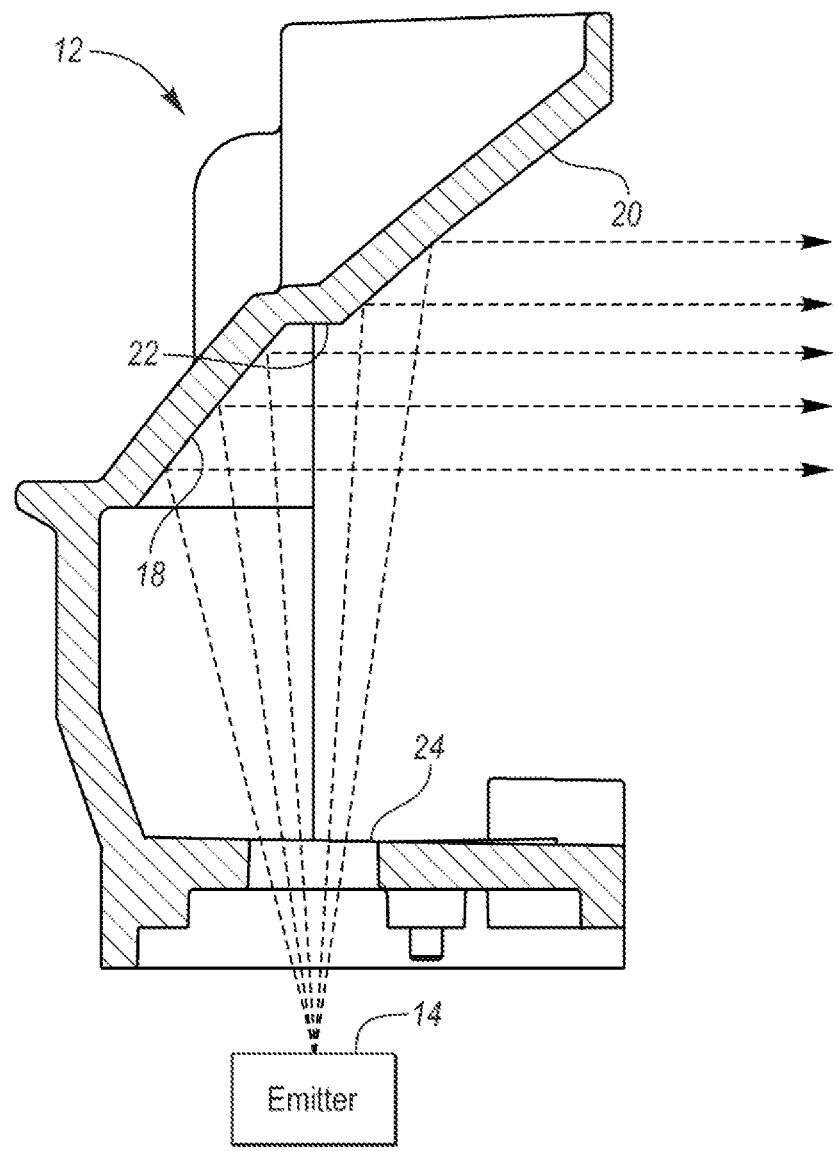

In one embodiment, shown in FIG. 2, FIG. 3, and FIG. 4, spreading optic 12 includes first reflective surface 18, second reflective surface 20, and third reflective surface 22 joining the first and second surfaces 18 and 20. In operation, emitter 14 is positioned substantially along the common axis of and before the reflective surfaces 18 and 20, and light rays emitted by the emitter 14 reflect off first and second reflective surfaces 18 and 20 to form a redirected light band. In one embodiment as shown in FIG. 6), reflective surfaces 18 and 20 may function as a convex mirror in the cross-section plane containing the (hence pseudo-conical) reflectors' axes in which rays reflecting off first reflective surface 18 are reflected in a pseudo-collimated fan away from first reflective surface 18 (e.g., at an angle perpendicular the emission vector and/or parallel the emitter exit face). Rays incident on second reflective surface 20 (arranged after the first reflective surface 18) are likewise reflected in a pseudo-collimated fan away from second reflective surface 20 (e.g., at an angle perpendicular the input beam axis and/or parallel the emitter 14 exit face). Rays incident on third reflective surface 22 (between the first and second reflective surfaces 18 and 20) can be reflected toward first or second reflective surface 18 and 20, diffused, absorbed, or have any suitable path. Alternatively the third reflective surface 22 may be omitted and replaced by an aperture or transparent section thereby allowing a portion of the emission beam to pass through the spreading optic body for other use (e.g. emission monitor detection; subsequent redirection for other purpose; dumping; etc.). Surface 22 may alternatively be absorbing.

One or more of reflective surfaces 18, 20, and 22 are preferably smooth, but can alternatively be textured. The reflective surfaces 18, 20, and 22 may be mirrored but can be frosted or have any other suitable reflectance characteristics. The reflective material, finish, or other parameters of the reflective surface(s) may be selected to maximize reflected light at the wavelength(s) of emitter 14 but can be otherwise selected. Non-limiting examples of the material include: aluminum, silver, gold, or any other suitable material or combination thereof. In a specific example, reflective surfaces 18, 20, and 22 are formed by a reflective coating, and the coating can include protected aluminum, with a reflectance over 85% at 850 nm.

First reflective surface 18 functions to reflect light along a vector fan substantially perpendicular to a cylindrical surface (e.g. redirect vector 90° relative to input beam axis) or to a conical surface (e.g. redirect vector other than 90° relative to input beam axis) having its axis parallel to the input beam axis. First reflective surface 18 (e.g., the reflective surface proximal of emitter 14) may be a straight cross section segment in a first plane shared by the input beam axis (e.g., in the x/z and/or y/z planes) but can alternatively be concave or convex. First reflective surface 18 may a concave cross section in a second plane perpendicular the first plane (e.g., perpendicular the input beam axis; in the x/y plane), such that first reflective surface 18 preferably forms a concave mirror, but can alternatively be convex or have any suitable shape.

In one embodiment of first reflective surface 18, the geometry of first reflective surface 18 may be aspheric (e.g. compound or rotationally symmetric) but can alternatively be spherical. The geometry of first reflective surface 18 may be the interior of a conic or frustum slice (e.g., be a concave surface curved in a plane cross-section perpendicular the conic axis), but can alternatively be the interior surface of a cylindrical section (e.g., cylinder, ungula of a cylinder, etc.), or have any other suitable geometry. First reflective surface 18 may be a slice of a circular cone (e.g., be a hemicone), or a slice of a right circular cone, but can alternatively be a slice of an oblique circular cone, elliptic cone, truncated cone (e.g., frustum), or any other suitable conic form. The right circular cone may be an isosceles cone (e.g., wherein the radius is the same as the cone height, wherein the angle between a generatrix and the base is 45°) but can alternatively be any other suitable cone type (e.g., wherein the angle between the generatrix and the base can be any suitable angle, such as 30°, 45°, etc.). The conic slice may be sliced perpendicular the conic base but can alternatively be sliced at an oblique or acute angle to the conic base. The conic slice may be through the conic apex, but can alternatively be offset from the conic apex, extend along the conic axis, or be otherwise aligned. In a specific example, the first reflective surface can have SAG values (e.g., the axial component of the displacement of the surface from the vertex, at a given distance from the conic axis or vertex) ranging from approximately −7.59 at 0.8 mm from the vertex to −1.725 at 7.9 mm from the vertex. However, the first reflective surface can have any suitable range of SAG values. In this variation, the interior of the conic slice may be smooth but can have any other suitable configuration.

First reflective surface 18 may be arranged with the apex distal the emitter (e.g., along the emission vector; with the base arranged proximal the emitter) but can be otherwise arranged.

Second reflective surface 20 functions to reflect light along a vector fan substantially perpendicular a cylindrical surface (e.g. redirect vector 90° relative to input beam axis) or to a conical surface (e.g. redirect vector other than 90° relative to input beam axis) having its axis parallel to the input beam axis. Second reflective surface 20 (e.g., the reflective surface distal of emitter 14) may have a straight cross section segment in a first plane shared by the input beam axis (e.g., in the x/z and/or y/z planes) but can alternatively be concave or convex. Second reflective surface 20 may have a convex cross section in a second plane perpendicular the first plane (e.g., perpendicular the input beam axis; in the x/y plane), such that second reflective surface 20 preferably forms a convex mirror, but can alternatively be concave or have any suitable shape.

In one embodiment of second reflective surface 20, the geometry of second reflective surface 20 may be aspheric (e.g. compound or rotationally symmetric) but can alternatively be spherical. The geometry of second reflective surface 20 may be the exterior of a conic or frustum slice (e.g., be a convex surface curved in a plane cross-section perpendicular the conic axis), but can alternatively be the interior surface of cylindrical section (e.g., cylinder, ungula of a cylinder, etc.), or have any other suitable geometry. Second reflective surface 20 may be a slice of a circular cone (e.g., be a hemicone), or a slice of a right circular cone, but can alternatively be a slice of an oblique circular cone, elliptic cone, truncated cone (e.g., frustum), or any other suitable conic form. The right circular cone is preferably an isosceles cone (e.g., wherein the radius is the same as the cone height, wherein the angle between a generatrix and the base is 45°) but can alternatively be any other suitable cone type (e.g., wherein the angle between the generatrix and the base can be any suitable angle, such as 30°, 45°, etc.). The conic slice may be sliced perpendicular the conic base but can alternatively be sliced at an oblique or acute angle to the conic base. The conic slice may be through the conic apex, but can alternatively be offset from the conic apex, extend along the conic axis, or be otherwise aligned. In a specific example, second reflective surface 20 can have SAG values (e.g., the axial component of the displacement of the surface from the vertex, at a given distance from the conic axis or vertex) ranging from approximately 3 at 1.54 mm from the vertex to 12.8 at 9.53 mm from the vertex. However, second reflective surface 20 can have any suitable range of SAG values. In this variation, the exterior of the conic slice is preferably smooth but can have any other suitable configuration.

The first and second cones (from which first and second reflective surfaces 18 and 20 are slices) can have the same dimensions (e.g., height, radius, etc.).

Second reflective surface 20 may be arranged with the apex proximal emitter 14 (e.g., along the emitter vector; with the base arranged distal emitter 14) and/or the apex proximal the apex of first reflective surface 18 but can be otherwise arranged. Second reflective surface 20 may be arranged with its reflective surface facing the same direction as the reflective surface of first reflective surface 18, a direction at an angle to first reflective surface 18, or at any suitable angle. Second reflective surface 20 may be laterally and axially offset from first reflective surface 18 (e.g., by third reflective surface 30), but can be otherwise arranged. First reflective surface 18 and second reflective surface 20 may be arranged with the respective conical axes arranged in parallel along an alignment axis but can alternatively be arranged with the conical axis of second reflective surface 26 at an angle to the conical axis of first reflective surface 24 (e.g., ±10°, 20°, etc.). The conical axes of first and second reflective surfaces 18 and 20 may be preferably parallel the emission vector and/or emitter normal (e.g., normal vector of the emitter's exit face), but can alternatively be at an angle (e.g., positive, toward the redirection vector; negative away from the redirection vector). The angle can be predetermined (e.g., based on the desired illumination angle, such as 90° from the desired illumination angle), dynamically selected, or otherwise determined.

Third reflective surface 22 may function to mechanically join first and second reflective surfaces 18 and 20, and can optionally reflect, transmit, or absorb light, or be omitted entirely. Third reflective surface 22 can reflect light toward emitter 14, reflect light away from spreading optic 12 (e.g., along the redirection vector), or reflect light in any suitable manner. Additionally, or alternatively, third reflective surface 22 can reflect or transmit a fraction of the emitter output to any appropriate kind of optical sensor (e.g., photosensor, the optical sensor of an imaging system, etc.), which can be used to monitor or provide feedback on the emitter output or serve any other suitable function.

Third reflective surface 22 may be flat, but can alternatively be curved (e.g., in the first plane shared by the emitter's emission vector, in the second plane perpendicular the first plane, etc.). The extent of third reflective surface 22 (e.g., extending from first reflective surface 18 to the second reflective surface 20) may be less than 10% of the base radius or radii of first and/or second reflective surfaces 18 and 20, but can alternatively have any suitable value.

Third reflective surface 22 may be arranged perpendicular the conic axis or alignment axis (e.g., extends laterally, along the x/y plane, between first and second reflective surfaces 18 and 20), but can alternatively extend parallel the alignment axis, extend at an angle to the alignment axis, or be otherwise arranged.

Spreading optic 12 body may include emitter aperture 24 that functions to permit and to partially limit light egress from emitter 14 to first, second, and/or third reflective surfaces 18, 20, and 22, example shown in FIG. 2 and FIG. 5. Alternatively, the emitter aperture 24 may be separate from the spreading optic 12 body (e.g. integral with a separate emitter mount; an alignable part or assembly). Emitter aperture 24 may be an unobstructed through-hole, but can alternatively or additionally include a filter, lens, or any other suitable optical element. Emitter aperture 24 may be circular, but can alternatively be a circle segment, a circle sector, be triangular, or have any suitable geometry. Emitter aperture 24 may have the same diameter throughout, but can alternatively have a variable diameter (e.g., convergent, divergent, or both toward the spreading optic), a textured bore, or be otherwise constructed. The diameter of emitter aperture 24 can be equal to the extent of third reflective surface 22 but can alternatively be larger or smaller.

Emitter aperture 24 can be arranged with the central axis aligned with (e.g., parallel, coaxial) the emission axis, but can be arranged with the central axis at a predetermined angle (e.g., 10°, 45°, etc.) the emission axis. The predetermined angle can be the angle at which the alignment axis is arranged relative to the emission axis or can be any other suitable angle.

Emitter aperture 24 may be aligned with third reflective surface 22. In one example, the central axis of emitter aperture 24 is aligned with the central axis of third reflective surface 22 (example shown in FIG. 6). However, emitter aperture 24 can be aligned with first or second reflective surfaces 18 and 20 (e.g., with an aperture edge or central axis aligned with the vertex or smaller section of the respective reflective surface), or otherwise arranged. In a specific example, emitter aperture 24 is aligned such that at least 90% of an emitter aperture projection area onto third reflective surface 22 plane overlaps third reflective surface 22, wherein the remaining portion of the projection overlaps first and/or second reflective surfaces 18 and 20. In a second specific example, emitter aperture 24 is aligned such that at least 90% of the projection area of third reflective surface 22 onto the plane of emitter aperture 24 overlaps emitter aperture 24.

In an example as shown in FIG. 5, spreading optic 12 includes a first hemiconical concave reflector (e.g., first reflective surface 18) and a second hemiconical convex reflector (e.g., second reflective surface 20), each hemicone including an apex, wherein the first and second hemicones are arranged with the respective conic axes aligned along an alignment axis and with proximal apexes aligned along a common plane. The first hemicone is arranged with an interior (concave) surface directed in a first direction (e.g., forward; aligned along a redirection axis perpendicular an alignment axis; etc.) and the second hemicone is arranged with an exterior (convex) surface directed in the first direction (e.g., forward). The spreading optic can optionally include a flat reflective surface (e.g., third reflective surface) joining the apexes of the first and second hemicones and extending along the common plane, wherein the flat reflective surface is arranged with a normal vector parallel the emission vector of emitter 14. Emitter 14 of illumination system 10 may be located proximal the first hemicone, with an exit face arranged perpendicular the hemicones' alignment axis.

In a specific example, first reflective surface 18 has a height of 8.48 mm; second reflective surface 20 has a height of 10.18 mm and a radius of 13.65 mm; and emitter 18 is arranged with an active surface 19.31 mm away from the base of the first reflective surface.

Referring to FIG. 1, splitter optic 16 functions to divide an input beam from spreading optics 12 into two or more beams, separated by one or more angles of separation (separation angles). The two or more beams may illuminate image scene 26. Imaging system 28 functions to record images of illuminated scene 26. Imaging system 28 includes lens 30 and optical sensor 32. Optical sensor 32 functions to capture the image created by lens 30 (e.g., convert light waves collected by lens 30 into sensor signals, represented as electrical voltages or currents). Lens 30 functions to project a field of view of a scene onto a 2-dimensional format.

The following applications are related to the present application: U.S. Pat. Appl. Ser. No. 16/192,877, U.S. Pat. Appl. Ser. No. 16/193,867 and U.S. Pat. Appl. Ser. No. 16/193,872 all filed on Nov. 16, 2018. Each of the identified applications is incorporated by reference herein in its entirety.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the invention without departing from the scope of this invention defined in the following claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A spreading optics system for distributing electromagnetic (EM) waves emitted by an emitter having an emission vector, the spreading optics system comprising:
reflective surfaces including:
a concave first reflector having a concave cross section in a first plane substantially perpendicular to the emission vector; and
a convex second reflector arranged further from the emitter than the concave first reflector, and having a convex cross section in a second plane substantially parallel the first plane;
the reflective surfaces configured to divergently redirect the EM waves into a vector fan at a predetermined angle relative to the emission vector.

2. The spreading optics system of claim 1, wherein the concave cross section and convex cross section is from circular cones.

3. The spreading optics system of claim 2, wherein the circular cones are a right circular cone.

4. The spreading optics system of claim 2, wherein the conical axes of the concave first reflector and the convex second reflector are arranged coaxially.

5. The spreading optics system of claim 2, wherein the conical axes of the concave first reflector and the convex second reflector are arranged in parallel.

6. The spreading optics system of claim 1, wherein the concave first reflector and the convex second reflector are laterally and axially offset from each other relative to each other.

7. The spreading optics system of claim 1, wherein the predetermined angle is 90° to produce a planar shape of the vector fan.

8. A spreading optics system for distributing electromagnetic (EM) waves emitted by an emitter having an emission vector, the spreading optics system comprising:
reflective surfaces including:
a concave hemiconic first reflector; and
a convex hemiconic second reflector arranged further from the emitter than the concave hemiconic first reflector,
the reflective surfaces configured to divergently redirect the EM waves into a vector fan at a predetermined angle relative to the emission vector, and the concave and the convex hemiconic first and second reflectors are laterally and axially offset from each other relative to the emission vector.

9. The spreading optics system of claim 8, wherein the concave hemiconic first reflector includes a first slice from a circular first hemicone and the concave hemiconic second reflector includes a second slice from a circular second hemicone.

10. The spreading optics system of claim 9, wherein the circular first and second hemicones are right circular cones.

11. The spreading optics system of claim 9, wherein the conical axes of the concave hemiconic first reflector and the convex hemiconic second reflector are arranged coaxially.

12. The spreading optics system of claim 8, wherein the predetermined angle is 90° to produce a planar shape of the vector fan.

13. A spreading optics system for distributing electromagnetic (EM) waves emitted by an emitter having an emission vector, the spreading optics system comprising:
reflective surfaces including:
a concave hemiconic first reflector; and
a convex hemiconic second reflector arranged further from the emitter than the concave hemiconic first reflector,
the reflective surfaces configured to divergently redirect the EM waves into a vector fan at a predetermined angle relative to the emission vector; and
an optical component configured to permit the EM waves to egress from the emitter to the concave hemiconic first reflector and the convex hemiconic second reflector.

14. The spreading optics system of claim 13, wherein the reflective surfaces further include a third reflector surface or an absorbing surface joining the concave hemiconic first and the convex hemiconic second reflectors.

15. The spreading optics system of claim 14, wherein an extent of the third reflector surface or the absorbing surface extending from the concave hemiconic first reflector to the convex hemiconic second reflector is less than 10% of a base radius of the first or second reflector.

16. The spreading optics system of claim 14, wherein the concave hemiconic first reflector includes a first slice from a first circular cone and the concave hemiconic second reflector includes a second slice from a second circular cone.

17. The spreading optics system of claim 16, wherein the third reflector or absorber is arranged perpendicular to the axes of the first and second circular cones.

18. The spreading optics system of claim 13, wherein the optical component is a filter or lens.

* * * * *